UNITED STATES PATENT OFFICE.

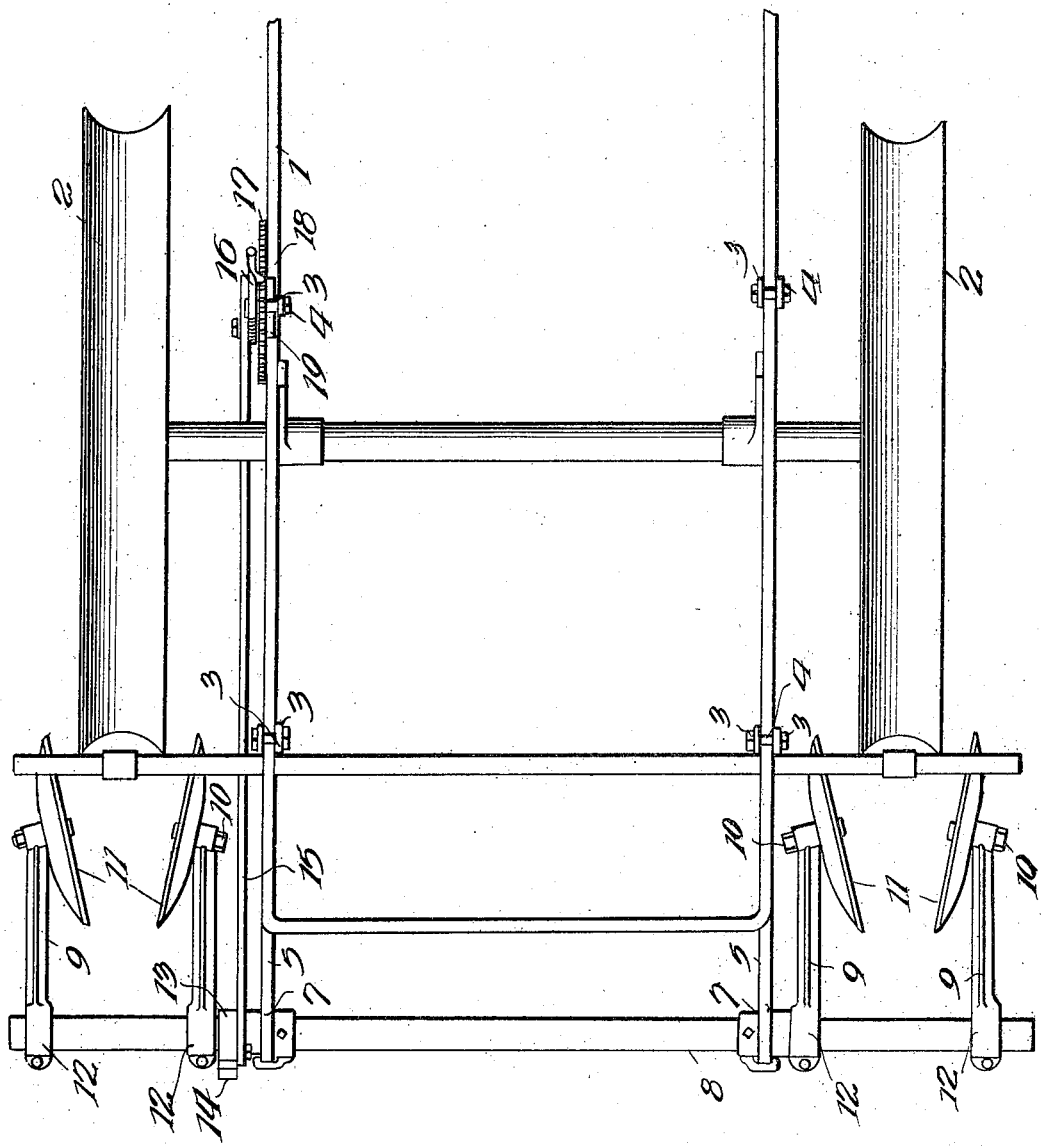

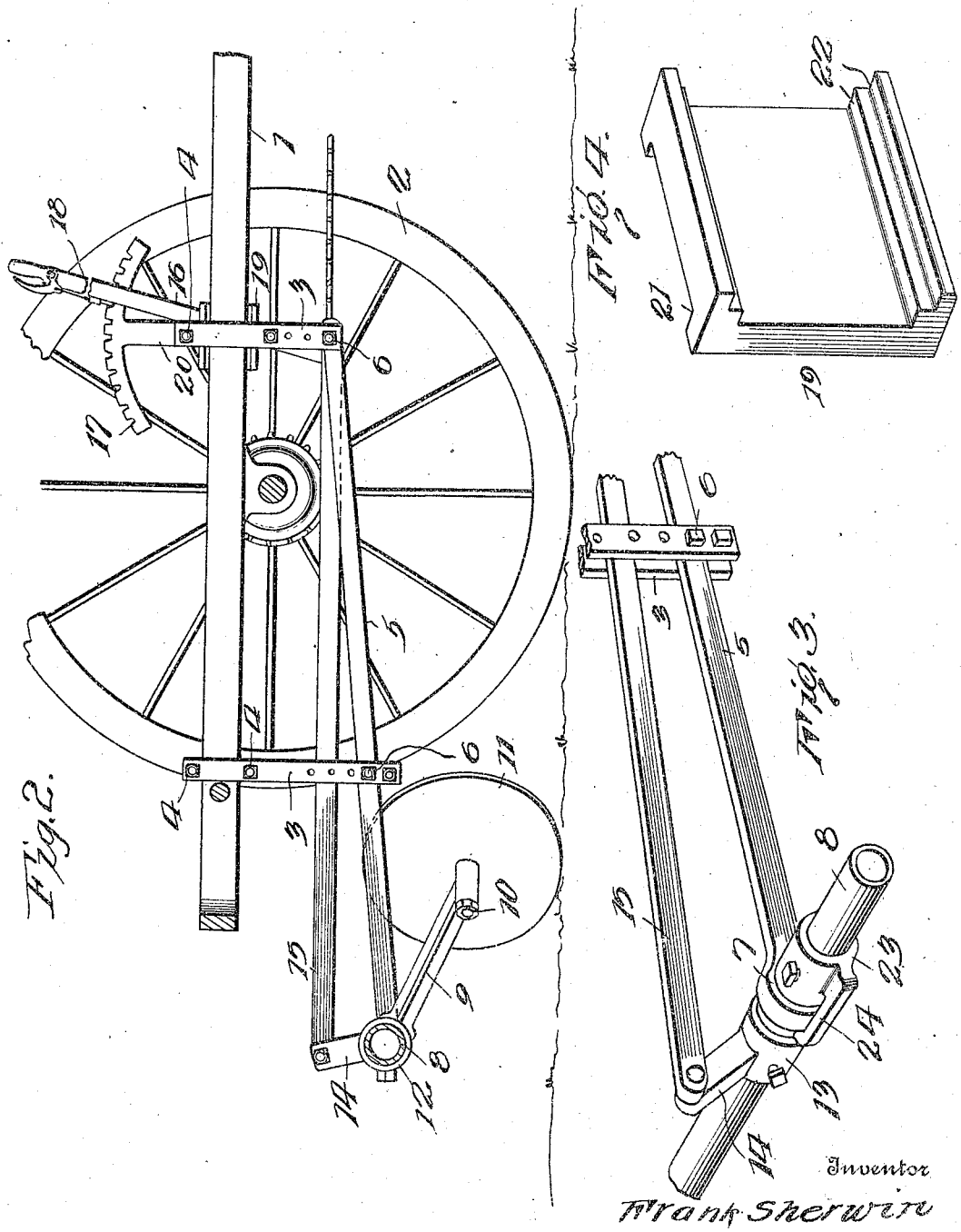

FRANK SHERWIN, OF BROOKINGS, SOUTH DAKOTA.

ATTACHMENT FOR PLANTERS.

1,235,606.   Specification of Letters Patent.   Patented Aug. 7, 1917.

Application filed September 12, 1916. Serial No. 119,703.

*To all whom it may concern:*

Be it known that I, FRANK SHERWIN, a citizen of the United States, residing at Brookings, in the county of Brookings and State of South Dakota, have invented certain new and useful Improvements in Attachments for Planters, of which the following is a specification.

This invention relates to attachments for corn planters and has for its object the provision of simple mechanism which may be readily connected to any type of corn planter and by the use of which the ground will be cultivated simultaneously with the planting. Specifically, the object of the invention is to provide improved means for raising and lowering the cultivator disks, to provide means which will prevent lateral movement of the axle or shaft upon which the cultivator disks are mounted, and to provide means for supporting the locking segment or rack rigidly in position and accommodating the same to planter frames of different widths.

The invention is illustrated in the accompanying drawings and will be hereinafter first fully described and then particularly pointed out in the claims following the description.

In the drawings:

Figure 1 is a plan view of my improved attachment showing the position of the same upon a planter frame;

Fig. 2 is a vertical longitudinal section of the same;

Fig. 3 is a detail perspective view of a portion of the rock shaft showing the bearing for the same and a portion of the means for rocking the same;

Fig. 4 is a detail perspective view of a bracket which is used in connecting the holding segment or rack to the frame.

The planter frame 1 may be of any well known or preferred form and is supported by ground wheels 2 which are arranged to run on the hills directly behind the seed spouts and press the soil over the seeds as they are planted. Hangers 3 are secured to the planter frame and these hangers each consists of a pair of bars or straps fitting against the opposite faces of the side bars of the planter frame and secured thereto by bolts 4 passing through the hangers immediately above and below the said side bars. When the bolts are tightened the hangers will be caused to clamp the side bars of the hanger frame so as to be secured firmly thereto. The forward hangers are considerably shorter than the rear hangers and draw-bars 5 are secured at their front ends to the forward hangers and pass between the members of the rear hangers, bolts 6 being inserted through the said draw-bars and the hangers to secure the draw-bars to the hangers. It will be readily noted, upon reference to Fig. 2, that the hangers are constructed with vertical series of openings so that the draw-bars may be adjusted vertically and the attachment made to conform to planter frames of different makes. The rear ends of the draw-bars 5 are formed into eyes 7 which form bearings for the axle or shaft 8 inserted therethrough and journaled therein, the said axle being preferably tubular so that, when necessary or desirable, sand or other material may be placed in the axle so as to increase the weight and thereby hold the cultivator disk more firmly to the ground. Secured to the axle or shaft 8 and projecting forwardly therefrom are arms 9 in the front ends of which are mounted pivots or shafts 10 which carry cultivator disks 11. The cultivator disks are so disposed that they run in the ground at opposite sides of the path traveled by the immediately preceding ground wheel and at equal distances from the central longitudinal line of said path. The rear extremities of the supports or arms 9 are formed into eyes or collars 12 which fit around the shaft 8 and are secured thereto in any preferred manner, as by set screws, or by having the eyes split and clamping bolts inserted through the split portions. A collar 13 is secured upon the axle or rotary shaft 8 at any convenient point and this collar is provided with a crank 14 extending laterally therefrom, a link 15 having its rear end pivoted to the outer end of said crank as shown and as will be readily understood. The front end of the link 15 is pivoted to the lower end of a lever 16 which is fulcrumed upon the front hanger 3, one member of said front hanger being extended above the planter frame and constructed or provided with a ratchet or holding segment 17 which is engaged by a latch 18 mounted on the lever and operated in a well known manner. A bracket 19 is disposed between the planter frame and the stem 20 of the said ratchet or holding rack and this bracket is provided in one side with a vertically extending groove 21 which is adapted to snugly engage the said stem 20 and in its opposite face the said bracket is constructed with two or more grooves 22 which extend horizontally of the bracket and are adapted to fit snugly upon the side bar of the planter frame. By providing a plurality of grooves 22 the bracket may be readily fitted to various planter frames.

It will be readily understood from the foregoing description, taken in connection with the accompanying drawings that I have provided a simple, inexpensive and efficient attachment which may be readily applied to any planter frame and which will effect cultivation at the same time the seed is planted without materially increasing the draft of the machine. By swinging the upper end of the lever 16 rearwardly the link 15 will be drawn forward so that the cultivator disks will take into the ground, but if the lever will be swung forwardly the link 15 will be pushed rearwardly and motion imparted to the crank 14 so that the shaft 8 will be rocked and the arms 9 consequently swung upwardly to lift the cultivator disk from the ground. The machine can then be moved from field to field as will be readily understood. The link 15 passes between the members of the rear hanger so that it is held against lateral movement and the draw-bars 5 are also disposed between the members of the hangers so that they will be held against all movement laterally or longitudinally relative to the planter frame. In order to prevent movement of the axle through the eyes or bearings 7 and the consequent shifting of the cultivator disks relative to the ground wheels 2, I secure firmly upon the shaft or axle 8 the collars 23 which are provided with retainer arms 24 extending beyond the ends of the sleeves and constructed to fit over and around the said bearing 7 as clearly shown in Figs. 1 and 3. The bearing fits closely between one end of sleeve 23 and the hook-like terminal of the arm 24 so that all end-wise movement of the shaft or axle 8 will be positively resisted and effectually prevented.

Having thus described the invention, what is claimed as new is:

1. In a planter attachment, the combination of draw-bars, means for connecting said draw-bars with a planter frame, a rock shaft journaled in the rear ends of said draw-bars, and retainers secured on said rock shaft and engaging around the ends of said draw-bars to prevent end-wise movement of the said shaft.

2. In a planter attachment, the combination of draw-bars, means for connecting said draw-bars with the planter frame, a rock shaft journaled in the rear ends of said draw-bars, sleeves secured on said rock shaft adjacent the draw-bars and bearing against the same, retainer arms projecting from said sleeves and engaging over the rear ends of the draw-bars, means for rocking said shaft, and cultivator members carried by said shaft.

3. In a planter attachment, the combination of hangers consisting of parallel members adapted to fit against opposite sides of a planter frame, draw-bars fitted between the members of said hangers and secured thereto, a rock shaft journaled in the rear ends of said draw-bars, cultivator members carried by said rock shaft, means for preventing end-wise movement of said rock shaft, and means for rocking said shaft.

4. In a planter attachment, the combination of a bracket having grooves in its opposite faces extending in angular relation, the grooves in one face of the bracket being adapted to engage the side bar of a planter frame, a hanger member fitting in the groove in the opposite face of said bracket, a holding rack at the upper end of said hanger member, a draw-bar secured to said hanger, a rock shaft journaled in the rear end of said draw-bar, cultivator members carried by said rock shaft, a collar secured upon said rock shaft, a crank extending from said collar, a lever fulcrumed upon said hanger and coöperating with said rack, and a link connecting the lower end of said lever with the outer end of said crank.

In testimony whereof I affix my signature.

FRANK SHERWIN. [L. S.]

Copies of this patent may be obtained for five cents each, by addressing the "Commissioner of Patents, Washington, D. C."